March 31, 1953 R. A. CARLSON 2,633,217
FRICTION CLUTCH DEVICE
Filed May 3, 1944 3 Sheets-Sheet 1
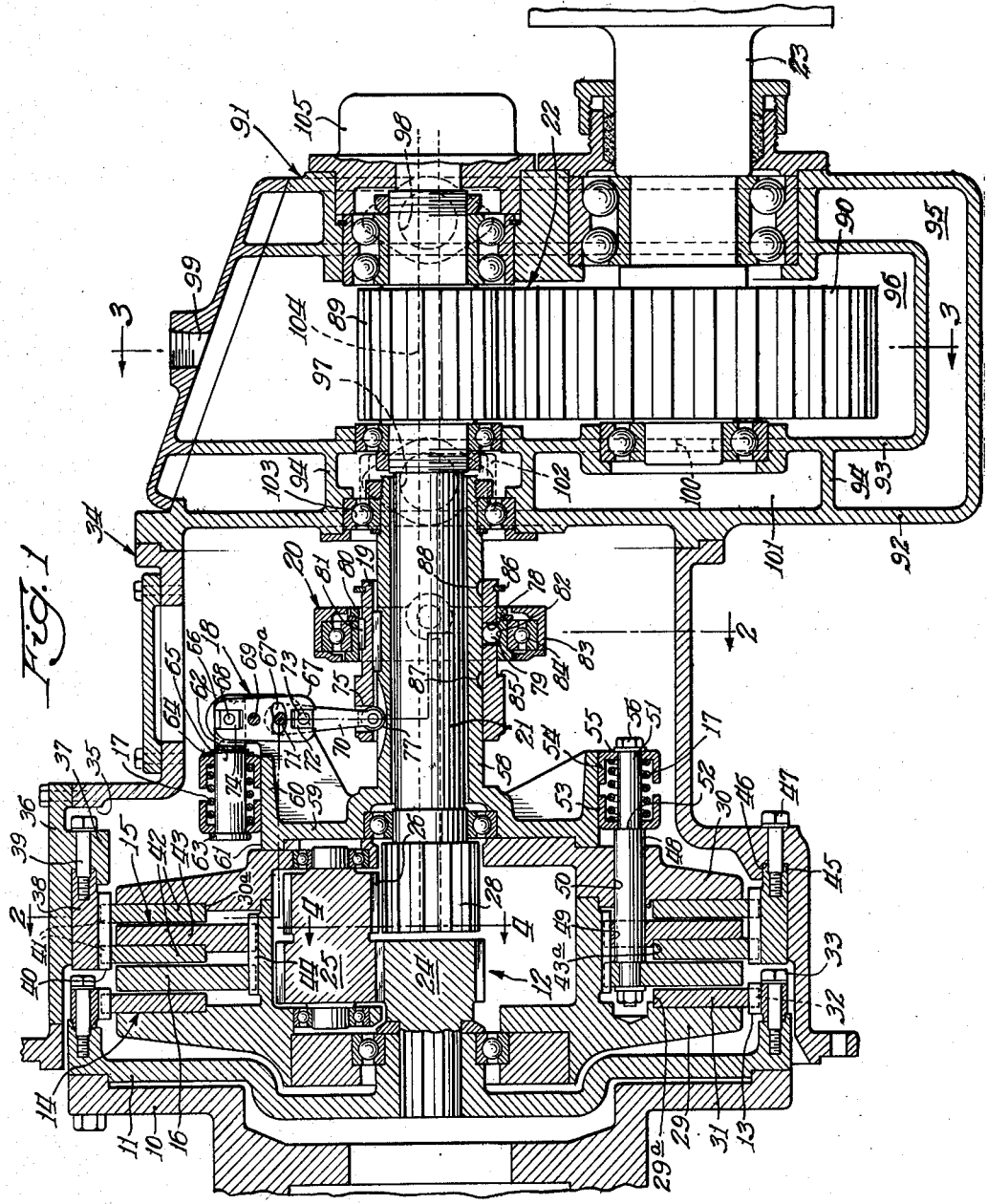
Inventor:
Raymond A. Carlson

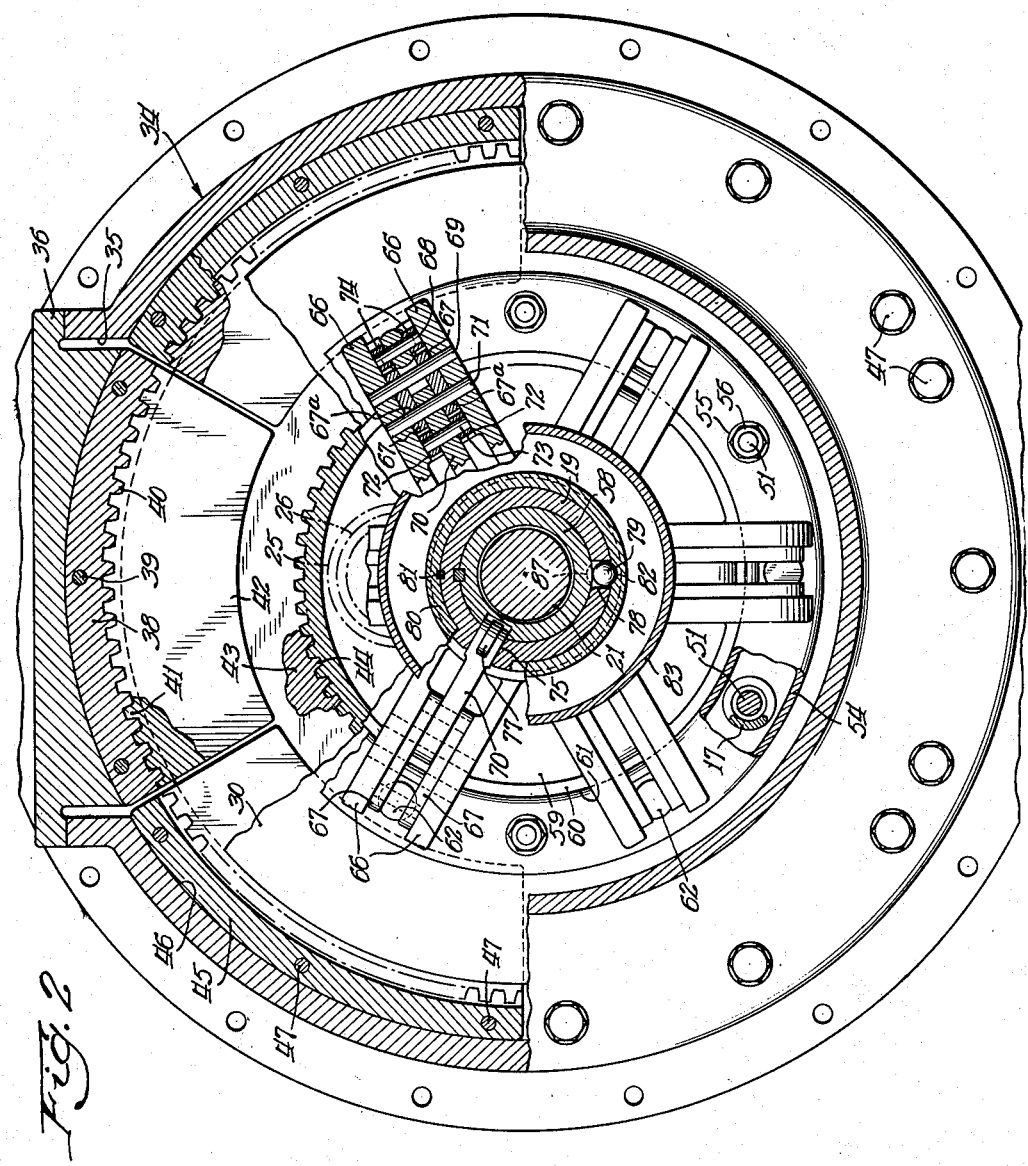

March 31, 1953  R. A. CARLSON  2,633,217
FRICTION CLUTCH DEVICE
Filed May 3, 1944  3 Sheets-Sheet 3
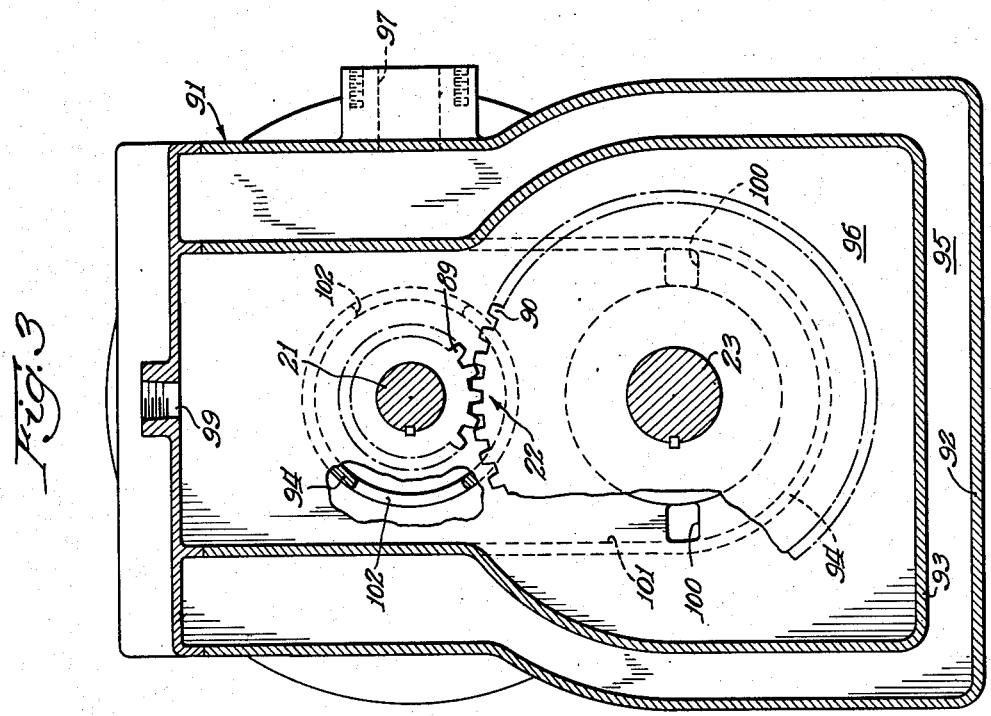
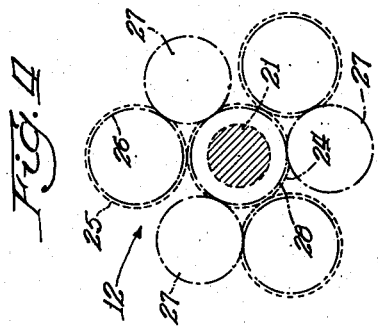
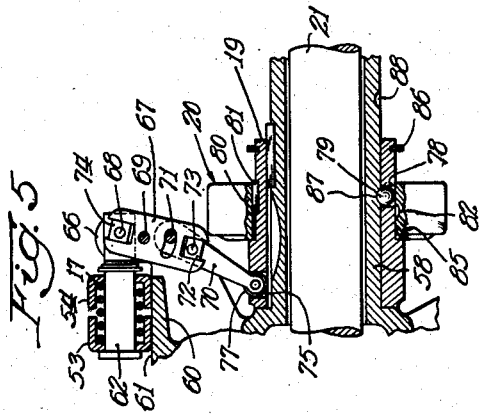
Inventor:
Raymond A. Carlson Patented Mar. 31, 1953

2,633,217

UNITED STATES PATENT OFFICE 2,633,217

FRICTION CLUTCH DEVICE

Raymond A. Carlson, Rockford, Ill., assignor to Borg-Warner Corporation, Chicago, Ill., a corporation of Illinois Application May 3, 1944, Serial No. 533,841

5 Claims. (Cl. 192—66)

This invention relates to mechanical power transmissions and particularly to transmissions which are adapted to provide a single speed forward and a single speed reverse. This invention is particularly useful in combination with a marine engine for propelling a vessel although it may be utilized in industrial equipment such as cranes, derricks and the like.

The principal object of this invention is to provide a forward and reverse mechanism in which friction devices are used to make the forward and reverse drives effective, the control for the friction devices being such that little or no power is required to maintain either device in operation or to maintain the transmission in neutral.

A specific object of this invention is to provide a control mechanism for a friction coupling such as a friction clutch or a friction brake which requires power to energize the coupling but which may be locked mechanically after energization so as to relieve the energizing means of further load.

Another specific object of this invention is to provide a friction coupling for a relatively large or heavy transmission wherein one of the elements of the coupling which is subject to the greatest wear may be removed and replaced without tearing down the entire transmission.

Another specific object of this invention is to provide a forward and reverse transmission for heavy torque loads wherein the torque transmitting elements may be cooled to prevent overheating.

These and other objects of this invention will become apparent from the following detailed description when taken together with the accompanying drawings in which:

Fig. 1 is a section through a complete transmission embodying a preferred form of this invention, Fig. 2 is a transverse section through the transmission taken along lines 2—2 of Fig. 1, Fig. 3 is a transverse section taken along lines 3—3 of Fig. 1, Fig. 4 is a schematic transverse section through the reversing gears taken along lines 4—4 of Fig. 1, and Fig. 5 is a view showing the control mechanism in its fully operated condition.

Referring now to Fig. 1 for a general description of the transmission, 10 is a driving flange which may be directly connected to a source of power, such as a diesel marine engine or the like, to which is bolted a driving disc 11 which, in turn, is splined to the driving gear of a reversing gear set 12 and to which are also bolted internally toothed driving segments 13. Said segments 13 drive one element of a clutch 14 which as will be hereinafter explained is effective to provide a forward drive through the transmission. Cooperating with gearing 12 is a brake 15 which is effective to establish a reverse drive through the gearing. Between clutch 14 and brake 15 is positioned a movable pressure plate 16 which is effective to make either the clutch or the brake operative, pressure plate 16 being controlled by means of a plurality of springs 17 which in turn are energized by a force-multiplying lever system 18 through a central control collar 19 and a shift collar 20, the latter collar being positioned axially by means of an exterior control (not shown).

Power from gearing 12 is imparted through an intermediate shaft 21 to a reduction gearing 22 whence it passes, after multiplication, to an output shaft 23.

Gearing 12 is comprised of an input gear 24 which meshes with a gear 25, the latter being one of a pair of cluster gears, the second gear 26 of the pair meshing with an idler 27 (Fig. 4) which in turn meshes with an output gear 28 formed on the forward end of intermediate shaft 21. The cluster gears are mounted for rotation with a pair of reaction plates 29 and 30, said reaction plates being connected together so as to form a unitary whole. Reaction plate 29 takes the reaction of the applying force for clutch 14 and reaction plate 30 takes the reaction of the applying force for brake 15. When clutch 14 is operated, both reaction plates and the cluster gears revolve with the input and output gears 24 and 28 respectively as a single unit; when brake 15 is operated, reaction plates 29 and 30 are stationary so as to cause cluster gears 25 and 26 to act as countershaft gears, and driving disc 11 and output shaft 21 are then rotatable relative to the reaction plates.

It will be apparent that when all the gears are rotated as a unit, that is, when clutch 14 is operated, shaft 21 will rotate at the same speed and in the same direction as input flange 10, and that when brake 15 is operated so as to hold gears 25 and 26 from revolving about the axis of shaft 21 a reverse drive will be effected between driving flange 10 and intermediate shaft 21.

Clutch 14 is comprised of an action member in the form of a plurality of annular sectors 31 (Figs. 1 and 2) each of which is formed at its outer periphery with teeth 32 engaging internal teeth on ring segments 13. Said ring segments 13 are removably secured preferably by means of bolts 33 to driving disc 11. It will be apparent that segments 31 are free to move axially a short distance to adjust themselves to the location of reaction plate 29. The reaction plate is provided with a shoulder 29a projecting laterally therefrom and into the space between the plate 29 and the pressure plate 16 and engaging the inner edges of the sectors 31 to slidably support and position the sectors 31 radially of the axis of rotation of the driving disc 11.

The housing 34 of the transmission has an opening 35 in the upper forward portion thereof which is covered by means of a plate 36 bolted to housing 34. Said plate 36 has a radially inwardly extending flange 37 to which a relatively wide ring segment 38 is secured by means of bolts 39. Plate 36 and ring segment 38 are removable, thereby exposing bolts 33 of the clutch and permitting a tool to be inserted into the opening to loosen the bolts and associated ring segments 13. This permits annular segment 31 nearest the opening 35 to be removed from the transmission and replaced without taking the entire transmission apart. The annular segment adjacent segment 13 may be removed next by turning driving flange 10 until the said segment is in substantially the position occupied by segment 13 before it was removed. When it is so positioned, its attaching bolts may likewise be withdrawn and the segment removed and replaced by another segment. This procedure is repeated until all of the segments 13 have been removed and replaced. Since a new segment is bolted in immediately after the old one has been removed there is no serious unbalance created to render difficult the turning of the flange 10. Thus a worn clutch may be repaired or replaced without tearing down the entire transmission.

Ring sectors 38 of brake 15 are similarly provided with internal teeth 40 which engage external teeth 41 on annular segments 42 so as to hold said segments against rotation at all times. A second pressure plate 43 is positioned between the segments, the first pressure plate 16 as well as the second pressure plate 43 being splined at 44 to an axially extending flange on reaction plate 29. When pressure plate 16 is moved to the right (Fig. 1) it packs both annular segments 42 and the second pressure plate 43 against reaction plate 30, and since annular segments 42 are held against rotation, all of the packed elements will likewise be held against rotation. The reaction plate 30 is provided with a shoulder 30a projecting into the space between the plate 30 and the pressure plate 43 and engaging the radially inner edges of the segments 42 to position the segments 42 radially of the axis of rotation of the driving disc 11. The pressure plate 43 has a shoulder 43a engaging the inner edges of the segments 42 between the plate 43 and pressure plate 16 to slidably support and position these segments radially of the axis of rotation of the driving disc 11.

A plurality of segments 42 is used as well as a corresponding number of ring sectors 40, the top ring sector being attached to plate 36 as previously described and being removable through opening 35 in housing 34. The method of removing ring sectors 40 however differs somewhat from the method of removing ring sectors 13 inasmuch as the ring sectors 40 are secured to the housing and therefore are not ordinarily rotatable. It will be observed, however, that each ring sector is provided with a tongue 45 which fits into a groove 46 in housing 34 and is slidable in said groove in a circumferential direction. By removing bolts 47, the ring sectors 38 are free to move circumferentially and hence may be slid around until they occupy the position of the top sector whereupon they may be removed from the housing and replaced. The turning of the sectors may be accomplished in any suitable manner as for example by momentarily applying the brake so as to lock sectors 42 to the pressure plates 16 and 43 and then rotating driving flange 10. Since the bolts 47 have been removed there is nothing to prevent the rotation of the entire brake assembly.

The control means for the clutch and brake will now be described. Pressure plate 16 is bolted to a plurality of axially extending pins 48 which pass through suitable openings 49 and 50 in pressure plate 43 and reaction plate 30, respectively. The protruding end 51 of each pin is of reduced diameter and forms a shoulder 52 against which a channel-shaped ring 53 is adapted to bear. Said ring 53 is provided with openings through which the portion 51 of the pin passes. A substantially identical channel-shaped ring 54 is also mounted on the reduced diameter portion 51 of pins 48 with the open portion of the channel facing the open portion of the channel of the ring 53. A washer 55, held by a bolt 56, provides an abutment for ring 54. A helical spring 17 is passed over each pin and holds the rings 53 and 54 against their respective abutments 52 and 55. Additional springs are inserted at spaced intervals as required to supply the requisite pressure.

Concentrically mounted with respect to intermediate shaft 21 is a sleeve 58 which has a radial flange 59 formed thereon, said flange in turn having an axial flange 60 formed at the outer periphery thereof. Said flange 60 is machined to provide a smooth cylindrical surface 61 on which channel-shaped rings 53 and 54 are adapted to slide. It is apparent that if pressure is exerted upon ring 53 to the right as shown in Fig. 1, that pressure will be transmitted through spring 17, ring 54 and washer 55 to pins 48, thereby moving pressure plate 16 in the same direction to operate brake 15. If pressure is exerted on ring 54 to the left as shown in Fig. 1, the pressure will be transmitted through spring 17 and ring 53 to shoulder 52 on pin 48 and remove said pin 48 to the left, thereby moving pressure plate 16 to the left to operate clutch 14.

The means for exerting pressure in either direction upon rings 53 and 54 comprises a plurality of pins 62 which pass through both rings 53 and 54 and are alternately spaced in said ring with pins 48. Said pins 62 are provided with heads 63 abutting ring 53 and with washers 64 abutting ring 54, washers 64 being fixed on pins 62 by means of snap rings 65. Referring now to Fig. 2, it will be observed that pins 62 pass between a pair of spaced lugs 66 formed on flange 60 and are flattened so as to pass between a pair of levers 67 likewise located between lugs 66. A pin 68 connects levers 67 and the flattened end of pins 62 to provide a pivoted connection therebetween. Said levers 67 are in turn pivotally mounted on pins 69 which are anchored in lugs 66. A second lever 70 is also pivoted by means of pin 71 in lugs 66, said pin 71 passing through arcuate openings 67a (Fig. 1) in levers 67 to permit relative movement therebetween. Said lever 70 is also connected to levers 67 through sliding bearing blocks 72 and a pin 73, the bearing blocks permitting pin 73 to move radially with respect to pivot pin 69 but prevent relative tangential movement therebetween. Similar bearing blocks 74 are used to support pins 68 in levers 67, the latter blocks being required because of the geometry of the connections, that is, pins 62 are constrained to move rectilinearly whereas levers 67 are pivoted and hence would have a curvilinear movement. Lever 70 extends inwardly and passes into an aperture 75 in the axially slidable sleeve 19 mounted on sleeve 58. Actual contact between the end of lever 70 and aperture 75 is made by means of a roller 77 so as to reduce friction at this point. In the form chosen for illustration there will be six sets of lugs 66, levers 67 and levers 70.

From the description thus far given it will be apparent that movement of sleeve 19 to the left as seen in Fig. 1 will cause the end lever 70 to move likewise to the left, the lever pivoting about its pin 71. This leftward movement will be transmitted through pin 73 and bearing blocks 72 to the lower ends of levers 67 which will likewise pivot about their pins 69 in a clockwise manner. This pivotal movement will then be transmitted through the upper ends of levers 67 and bearing block 74 to pins 68 and the ends of pins 62, thereby moving pins 62 axially to the right as shown in Fig. 1. This movement as will be recalled results in the operation of brake 15. Similarly a movement of sleeve 19 in the opposite direction will result in a movement of pins 62 to the left as seen in Fig. 1 which movement results in the operation of clutch 14. Because of the relative locations of pivot pins 69 and 71 and the connecting pin 73, a force multiplication will be effected between roller 77 and pin 62.

Axial movement of sleeve 19 is effected in the following manner. One or more circular openings 78 are provided in sleeve 19, the diameter of the openings being greater than the thickness of the sleeve. A ball 79 is retained in said opening 78, and since the diameter of the ball is greater than the thickness of the sleeve, a portion of it will project beyond the surface of the sleeve. A ring 80 is keyed as at 81 to sleeve 19 so as to be rotatable therewith but movable axially thereon. Said ring 80 is provided with a depression 82 in which the protruding portion of ball 79 is received. Ring 80 is connected to an exterior control ring 83 by means of a ball bearing 84. Said exterior control ring 83 may be moved axially by any suitable exterior control linkage (not shown) between a shoulder 85 on sleeve 19 and a snap ring 86 located near the right hand (Fig. 1) extremity of sleeve 19. As shown in Fig. 1, control ring 83 is in the position corresponding to neutral and in this position it will be observed that levers 70 and 67 are aligned and are in substantially the mid-position of their range of movement. In this position of the levers pressure plate 16 is spaced from both reaction plates 29 and 30 a sufficient distance so that neither clutch sectors 31 nor brake sectors 42 are clamped. When exterior control ring 83 is moved to the left as seen in Fig. 1, the leftward movement will be transmitted through ball bearing 84 to ring 80 and then through ball 79 and its contact with openings 78 to sleeve 19. Ring 80 and sleeve 19 will move together until ball 79 is aligned with a depression 87 in sleeve 19, whereupon the ball will move into this depression and will permit ring 80 to move relative to sleeve 19 until the ring abuts shoulder 85. While ring 80 and sleeve 19 are moving together the force required to compress springs 17 to actuate brake 15 must be supplied from the exterior through exterior control ring 83. After ball 79 is dropped into depression 87, however, and ring 80 is moved relatively to sleeve 19 so that its depression 82 is no longer aligned with ball 79, the pressure of springs 17 is taken on sleeve 19 and the exterior control ring 83 is thus relieved of the operating pressure. This means that although a certain amount of force is required to bring the brake into operation, it is not necessary to maintain that force in order to maintain the brake operated. The force required to bring the brake into operation is of course reduced due to the force-multiplying effect produced by the double lever arrangement.

Movement of control ring 83 to the right as seen in Fig. 1 will similarly result in a simultaneous movement of sleeve 19 with ring 83 until ball 79 drops into a recess 88, whereupon sleeve 19 will stop and ring 80 will move relative to sleeve 19 until it strikes snap ring 86, the movement of ring 80 relative to 19 resulting in the locking of ball 79 in recess 88 and relieving the exterior control ring 83 of the force required to maintain clutch 14 in engagement.

Gearing 22 is comprised of a drive pinion 89 which is formed directly on intermediate shaft 21 and a driven gear 90 of larger diameter than gear 89 so as to provide a torque multiplication between intermediate shaft 21 and output shaft 23. Said gears 89 and 90 are mounted by means of suitable bearings in a double-walled double-chambered housing 91 which is bolted or otherwise secured to housing 34. Housing 91 is comprised of an outer wall 92, an inner wall 93 and partitions 94 which divide housing 91 into an outer chamber 95 and an inner chamber 96 (Fig. 3). Outer chamber 95 is a cooling chamber which is in communication with inlet and outlet openings 97 and 98 by which cooling water is circulated around chamber 96. Chamber 96 is in communication with the gearing and with the various bearings and is supplied through a breather opening 99, or by removing the cover of casing 91, with sufficient lubricant to lubricate the gears and bearings. The lubricant in chamber 96 is forced through a central opening 104 in shaft 21 by means of a pump 105 to the gears 24, 25, 26, 27 and 28 and then into the space between shaft 21 and sleeve 58. From there it passes rearwardly through bearing 103 and a side opening 102 in a continuation of chamber 96 shown in Fig. 1 at 101. Inner wall 93 has opening 100 (Fig. 3) through which the lubricant returns to chamber 96.

It will be apparent that in the above construction the axial thrusts produced by engaging and disengaging the clutch and brake are transmitted through sleeve 58 to bearing 103 and to the housing 34 and are not imparted to the driving flange 10 and the prime mover.

It is understood that the foregoing description is merely illustrative of a preferred embodiment of this invention and that the scope of this invention is not to be limited thereto but is to be determined by the appended claims.

I claim:

1. In a power transmitting mechanism, a coupling device comprising a rotatable drive member, a plurality of segments of friction elements having a driving connection with said drive member, a driven member comprising a reaction plate, and a pressure plate spaced from the reaction plate, said friction elements being positioned between the reaction and pressure plates and adapted to be clamped therebetween, means for centering the friction elements with respect to the rotatable drive member, said means including an anti-friction support on the drive member for the reaction plate to locate the reaction plate accurately relative to the drive member, and a shoulder on the reaction plate projecting into the space between the reaction plate and pressure plate, said shoulder serving to position the friction elements radially of the axis of rotation of the drive member.

2. In a power transmitting mechanism, a coupling device comprising a rotatable drive member, a plurality of segments of friction elements having a driving connection with said drive member, a driven member comprising a reaction plate, and a pressure plate spaced from the reaction plate, said friction elements being positioned between the reaction and pressure plates and adapted to be clamped therebetween, and means for centering the friction elements with respect to the rotatable drive member, said means including a support on the drive member for the reaction plate to locate the reaction plate accurately relative to the drive member, and means associated with the reaction plate disposed in the space between the reaction plate and pressure plate and serving to position the friction elements radially of the axis of rotation of the drive member.

3. In a power transmitting mechanism, a housing, a coupling device in the housing comprising rotatable action and reaction members, one of said members being movable toward the other to effect engagement therebetween to render the coupling device operative, said movable member being annular and formed of distinct segments slidably supported by the other member, a support for said movable member, means for detachably connecting said movable member segments to said support, said housing having an opening in proximity to the movable member and coextensive with one of the segments such that the detachable means can be reached from the exterior of the housing and a segment when detached may be passed through said opening.

4. In a power transmitting mechanism, a housing, a driving member and a driven member in said housing, a plurality of segmental friction elements between said members radially arranged about the axis of rotation thereof and movable axially relative thereto, means for detachably connecting said elements at their radially outward portions to one of said members for rotation therewith, means on the other member for slidably supporting said elements at their radially inner portions, said housing having an opening in proximity to said elements and coextensive with one of said elements such that the detachable means can be reached from the exterior of the housing and a segment when detached may be passed through said opening.

5. In a power transmitting mechanism, a housing, a coupling device in the housing comprising a rotatable drive member, a plurality of drive segments detachably secured to the drive member, a plurality of segments of friction elements having a driving connection with the drive segments and slidable axially thereon, a driven member comprising a reaction plate, and a pressure plate spaced from the reaction plate, said friction elements being positioned between the reaction and pressure plates and adapted to be clamped therebetween, the housing having an opening in proximity to the friction elements and coextensive therewith, whereby the drive segments may be detached from the drive member and both the drive segments and segmental friction elements may be removed radially from the housing and replaced, a closure member for the opening, and means for centering the friction elements with respect to the rotatable drive member, said means including an anti-friction support on the drive member for the reaction plate to locate the reaction plate accurately relative to the drive member, and a shoulder on the reaction plate projecting into the space between the reaction plate and pressure plate, said shoulder serving to position the friction elements radially of the axis of rotation of the drive member.

RAYMOND A. CARLSON.

REFERENCES CITED

The following references are of record in the file of this patent:

UNITED STATES PATENTS

| Number | Name | Date |
|---|---|---|
| 599,779 | Grist | Mar. 1, 1898 |
| 793,224 | Perkins | June 27, 1905 |
| 1,305,029 | Tibbetts | May 27, 1919 |
| 1,843,490 | Spase | Feb. 2, 1932 |
| 1,861,253 | Wemp | May 31, 1932 |
| 1,933,208 | Cotal | Oct. 31, 1933 |
| 2,038,017 | Wemp | Apr. 21, 1936 |
| 2,059,935 | Eason | Nov. 3, 1936 |
| 2,095,816 | Johansen | Oct. 12, 1937 |
| 2,116,739 | Eason | May 10, 1938 |
| 2,230,604 | Ware | Feb. 4, 1941 |
| 2,259,461 | Eason | Oct. 21, 1941 |
| 2,278,578 | Feller | Apr. 7, 1942 |
| 2,303,201 | Eason | Nov. 24, 1942 |
| 2,330,856 | Adamson | Oct. 5, 1943 |
| 2,366,610 | Godfrey | Jan. 2, 1945 |
| 2,385,517 | Hunt | Sept. 25, 1945 |